Dec. 30, 1924.
H. F. BROWN
SPOOL HOLDER
Filed May 29, 1924
1,520,748
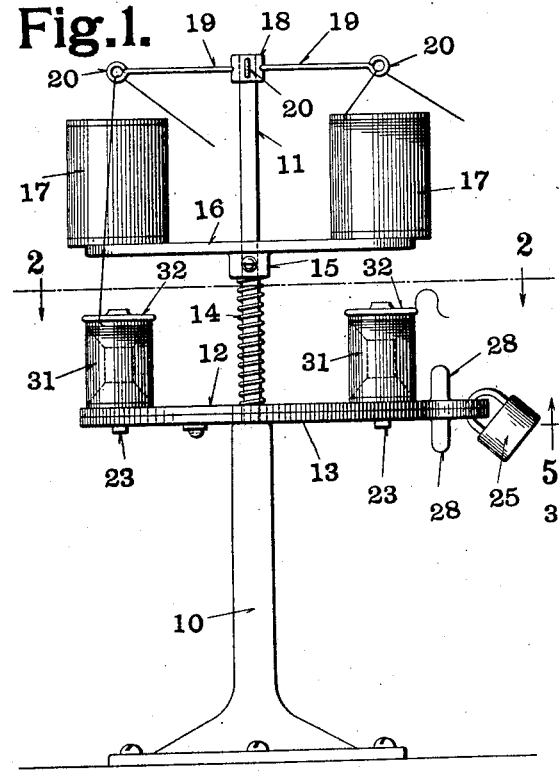
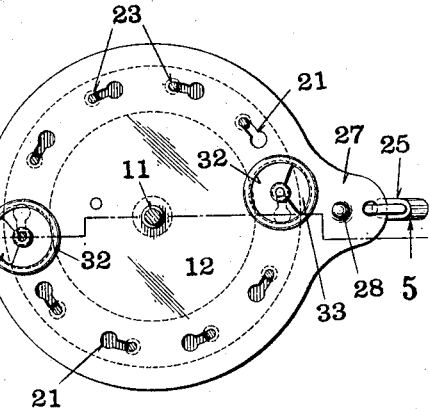
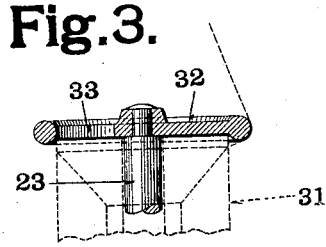
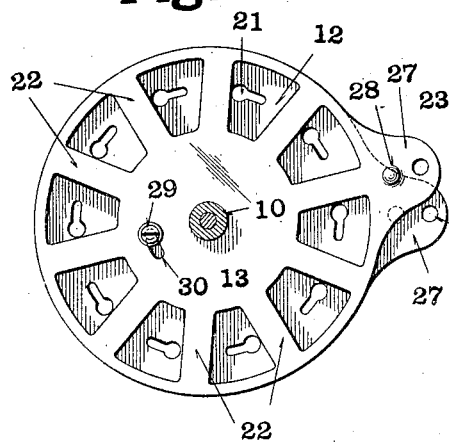
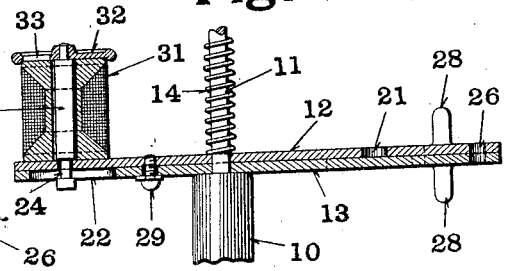
INVENTOR
HARVEY F. BROWN
BY
ATTORNEY Patented Dec. 30, 1924.

1,520,748

UNITED STATES PATENT OFFICE.

HARVEY F. BROWN, OF ST. LOUIS, MISSOURI, ASSIGNOR TO CURLEE CLOTHING COMPANY, OF ST. LOUIS, MISSOURI, A CORPORATION OF MISSOURI.

SPOOL HOLDER.

Application filed May 29, 1924. Serial No. 716,592.

*To all whom it may concern:*

Be it known that I, HARVEY F. BROWN, a citizen of the United States of America, residing at the city of St. Louis, State of Missouri, United States of America, have invented a certain new and useful Spool Holder, of which the following is such a full, clear, and exact description as will enable any one skilled in the art to which it appertains to make and use the same, reference being had to the accompanying drawings, forming part of this specification.

My invention relates to a spool holder and is particularly adapted for use in factories where the operators necessarily have at hand a considerable number of spools of valuable thread, such as silk, in different sizes and colors.

One object of my invention is to provide simple and effective means for locking the spools in position in the holder to prevent either accidental loss or theft.

Another object of my invention is to so construct the device that there will be little or no variation in tension of the thread as it is drawn off the spool, such as would be caused either by rotating the spool or by allowing the thread to come in contact with the wooden flanges of the spool when drawn off a non-rotary spool without suitable protective means.

In the accompanying drawings which illustrate one form of holder made in accordance with my invention, Figure 1 is a side elevation; Figure 2 is a section taken on the line 2—2 of Figure 1, part of the spool spindles being broken away; Figure 3 is an enlarged section through the upper end of one of the spool spindles; Figure 4 is a bottom view of the spool table; and Figure 5 is a section taken on the line 5—5 of Figure 2, the padlock being omitted.

The base of the device, indicated at 10, is provided with an upwardly projecting rod 11 surrounding which is the spool table consisting of an upper plate 12 and a lower plate 13. This table is rotatable on the top rod 11 but is frictionally held in position by the tension of a helical spring surrounding the rod and situated between the table and a hub 15 on cross arm 16. Spools 17 of larger size than those carried by the spool table may be carried in this cross arm and the rod 11 extends to a point above such spools terminating in a hub 18 carrying wire arms 19, preferably four in number, having eyelets 20 formed in their ends. These arms 19 should be of such length that the eyelets will be directly over the center of the spool spindles which will be hereinafter described.

The upper plate 12 of the spool table is provided with keyhole slots 21. In the drawings I have shown these as ten in number but the number may be varied to adapt the device to hold a different number of spools. Formed in the lower plate 13 are segmental slots corresponding in number to the keyhole slots in the upper plate so that the parts of the plate between the segmental slots form locking bars 22 cooperating with the keyhole slots to lock the spool spindles 23 in position. The spool spindles, which correspond in number with the keyhole slots, are of such diameter as to just pass through the wide part of a keyhole slot and each has formed near its lower end a reduced portion 24 adapted to be forced into the narrow portion of the keyhole slots by the locking bars when the plates 12 and 13 are moved into the relative position shown in Figure 2. This reduced portion 24 forms a shoulder adapted to be engaged by one of the locking bars 22 and thus effectively lock the spindle against removal. When in this position the two plates may be secured against relative movement by a padlock 25 passing through holes 26 on lugs 27 formed on the plates. Handles 28 serve to move the plates relatively to lock and release the spindles and the relative movement of the plates is preferably limited by a screw 29 extending through a short slot 30 in the lower plate.

Each of the spindles 23 is of just sufficient length to pass through one of the spools 31 and have its locking shoulder engage with a lock bar. Riveted or otherwise permanently secured to the upper end of each of the spindles is a disk 32 of such size as to project slightly beyond the flange of the spool and having its periphery rounded and polished so that the thread may slide around it as it is unwound from the spool without any liability of catching as would occur if the thread were allowed to come in contact with the flange of the spool which is often rough and usually provided with a notch to hold the end of the thread. Formed in each of the disks 32 is a sight opening 33 through which the number on the end of the spool may be seen so as to positively identify the size and color of the thread.

The operation of my device will be readily understood. To secure the spools in position the plates 12 and 13 are moved into the relative position shown in Figure 4, the spindles removed and passed through the desired spools after which the spindles are again placed in position and the plates moved back into the relationship shown in Figure 2. Padlock 25 may now be applied to effectively lock the spools against removal. The spool table is now rotated until the spool containing the desired size and color of thread, as identified through the sight opening, is positioned directly below one of the eyelets 20 and the thread passed through the eyelet as shown in Figure 1. Owing to the position of the spool directly under the eyelet the thread may be unwound without rotating the spool, the thread simply sliding around the rounded, polished edge of the disk.

Having fully described my invention, what I claim as new and desire to secure by Letters Patent of the United States is:

1. In a device of the class described, the combination with a support, of a thread guide, a plurality of vertical spool holding devices each provided at its upper end with a retaining head, means for detachably securing said devices to the support, and means for positioning a selected spool under the thread guide.

2. In a device of the class described, the combination with a support, of spool holding spindles each provided with a disk projecting beyond the spool flange, and means for detachably securing said spindles to the support.

3. In a device of the class described, the combination with a support, of spool holding spindles each provided with a disk projecting beyond the spool flange and having its periphery rounded and polished, and means for detachably securing said spindles to said support.

4. In a device of the class described, the combination with a support, of spool holding spindles each provided with a disk projecting beyond the spool flange and with a sight opening to display the spool number, and means for detachably securing said spindles to the support.

5. In a device of the class described, the combination with a base, of a horizontal spool table carried thereby and comprising two relatively movable disks, and spool spindles positioned perpendicularly to said table and adapted to be secured to or detached therefrom by the relative rotation of its parts.

6. In a device of the class described, the combination with a base, of a rotary horizontal spool table carried thereby, frictional means for holding said table in position, vertical spool spindles detachably carried by said table and each provided at its upper end with a retaining head, and a thread guide carried by said base above said spindles.

7. In a device of the class described, the combination with a base, of a rotary spool table carried thereby and comprising two relatively movable parts, spool spindles adapted to be secured to and detached from said table by the relative movement of its parts, means for locking the parts of said table in spindle retaining position, said spindles each being provided with a disk projecting beyond the spool flange, and a thread guide carried by said base above the spool spindles.

In testimony whereof, I have hereunto set my hand this the 27th day of May, 1924.

HARVEY F. BROWN. [L. S.]